No. 748,896. PATENTED JAN. 5, 1904.
W. U. WADSWORTH.
VEHICLE BRAKE.
APPLICATION FILED JULY 1, 1903.
NO MODEL.
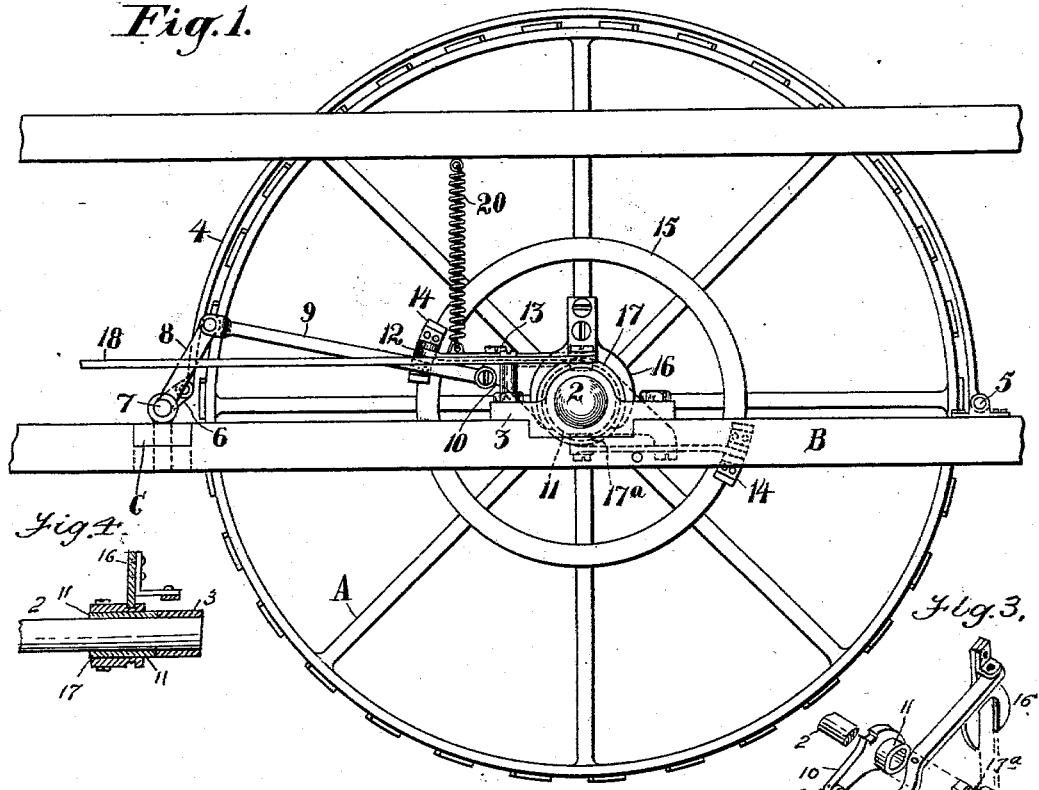
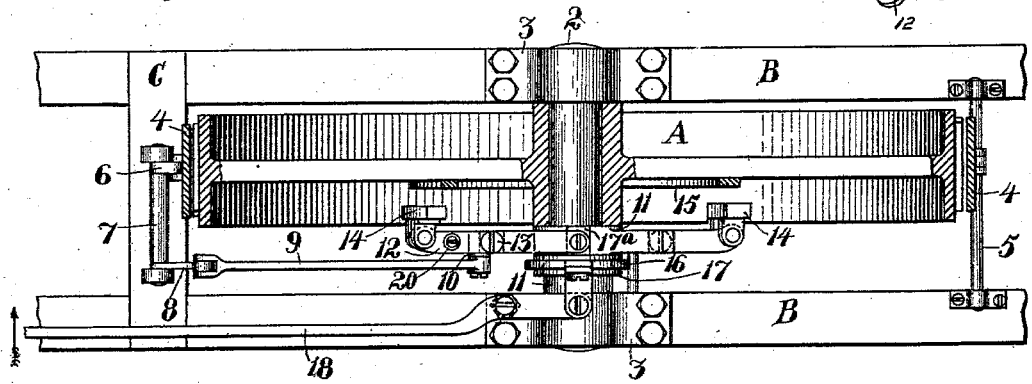
Witnesses:  
F. C. Fliedner.
Inventor,  
William U. Wadsworth  
By Geo. H. Strong.  
Atty.

No. 748,896. Patented January 5, 1904.

UNITED STATES PATENT OFFICE.

WILLIAM U. WADSWORTH, OF SUTTER CITY, CALIFORNIA.

VEHICLE-BRAKE.

SPECIFICATION forming part of Letters Patent No. 748,896, dated January 5, 1904.

Application filed July 1, 1903. Serial No. 163,873. (No model.)

*To all whom it may concern:*

Be it known that I, WILLIAM U. WADSWORTH, a citizen of the United States, residing at Sutter City, county of Sutter, State of California, have invented an Improvement in Wheel-Brakes; and I hereby declare the following to be a full, clear, and exact description of the same.

My invention relates to an improved brake for wheels, and it is especially applicable to the bearing-wheels of traveling harvesters and the like.

It consists of a band-brake partially encircling the periphery of the wheel normally out of contact therewith and means by which the brake is applied by a frictional device which is actuated by the rotation of the wheel itself.

It also comprises details of construction which will be more fully explained by reference to the accompanying drawings, in which—

Figure 1 is a side elevation showing the application of my device to a wheel. Fig. 2 is a plan view with section of the wheel in horizontal plane of the wheel-shaft. Fig. 3 is a detail showing the sleeves and levers separated. Fig. 4 is a sectional detail of the sleeves and the ring 16.

In the use of band-brakes which are applied to the periphery of wheels or drums it is common to apply the brake by means of lever connections which are actuated by hand.

My device is especially designed for application to traveling harvesters in which large teams of animals, sometimes as many as forty in number, are employed to haul the machine about the field while it cuts, threshes, cleans, and sacks the grain. Such teams often become unmanageable from fright, and the results are serious and dangerous, and it requires a very powerful application of the brake upon the heavy machinery to enable the driver to control them.

It is the object of my invention to provide such a brake and a means for applying it.

In the drawings I have only shown a bearing-wheel and so much of the frame of the machine as will enable me to illustrate my invention.

A represents a wheel of a harvester or like machine having an axle or shaft 2, which is journaled in boxes 3 upon the frame-timber B.

4 is a band-brake one end of which is hinged to the frame by means of a stout hinge bolt or pin, as at 5. The other end of the band is connected with a short lever-arm, as 6, which projects from a turnable shaft or roller 7, suitably journaled upon the transverse frame-timber C and just in front of the wheel.

The band 4 is usually made of heavy sheet or plate metal of sufficient stiffness so that when the rocker-arm 6 is turned upwardly it will lift the band, so as to practically be clear of the wheel-rim, and when this rocker-arm 6 is drawn down by turning the shaft or roller 7 it will draw the band 4 tightly against the rim of the wheel, and as it incloses substantially half the periphery of the wheel the frictional pressure which may be brought upon the wheel is sufficient to prevent the wheel from revolving, and as such wheels are provided with transverse bars on the periphery to cause them to hold firmly to the ground it will be understood that the friction of these bars upon the ground will be a great aid to checking the movement of the machine.

In order to operate this brake without an undue expenditure of manual power, I have shown devices which are operated as follows: 8 is a lever-arm projecting upwardly from the roller or shaft 7, and 9 is a connecting-rod one end of which is attached to the upper end of the arm 8. The other end of the connecting-rod is pivoted to a lever-arm, as shown at 10. This lever-arm projects toward the front from a sleeve 11, which surrounds the hub of the wheel, as shown. 12 is a lever fulcrumed at 13 to the projecting arm 10 and carrying upon its short arm a shoe 14. 15 is a stout rim secured to the spokes of the wheel and presenting a flat surface against which the shoe 14 may be pressed, and when this shoe is pressed against the rim the friction will be sufficient so that as the rim revolves it tends to carry the shoe downward with it, and this acting through the link or connecting-rod 9 pulls upon the lever 8, thus pulling upon the rocker-arm 6 and through it drawing the band-brake powerfully against the wheel.

In order to throw the shoe 14 into or out of contact with the rim 15, I have shown one end of the lever-arm 18 connected with a ring 16, which is turnable in a grooved or channeled sleeve 17, which also fits upon the hub of the wheel and outside of the ring or sleeve 11. The channeled sleeve 17 has lugs or extensions 17ª, which extend into corresponding slots in the ring 11, and this allows the sleeve 17 to be drawn outward from the rim 11 without being disengaged from it. A lever 18 is suitably fulcrumed to a stationary point. As here shown, it is pivoted to the top of one of the bolts which hold the axle-box 3 in place, and the end of this lever extends outwardly to a point within reach of an operator. When this lever is drawn in the direction shown by the arrow, it will act through its connection with the ring 16 to pull this ring and through it the sleeve 17 outwardly and away from the hub of the wheel, and this operating through the fulcrumed lever 12, which has its inner end pivoted to the movable part of the sleeve 17, acts to force the shoe 14 against the rim 15. This action, as previously described, causes a circular movement of the sleeve 11 and its projecting arm 10 and through the link 9 acts to apply the brake; but as the lever 18 is connected with the loose ring 16 it will be seen that this does not participate in the circular movement of the other contacts, but remains in its normal position, so as not to interfere with the fulcrum-point of the lever 18.

When the brake is to be taken off, it is done by means of a spring 20 or equivalent weight. As here shown, one end of the spring is fixed to some stationary point and the other end is attached to a part which is turnable with the shoe-carrying lever and the sleeve 11, so that when pressure upon the shoe is relieved the spring returns the parts to their normal position, turning the roller 7 back, so that the rocker-arm 6 will lift the band clear of the wheel.

The previous description mentions but one brake-shoe and actuating-lever; but it will be seen that two of the friction-shoes 14 and connected levers can be employed, as shown in the drawings. The shoes may also be so mounted as to act upon the periphery of the wheel, and the intermediate mechanism may be changed without materially altering the character of my invention, the essential feature of which is the automatic or self application of the brakes.

Having thus described my invention, what I claim, and desire to secure by Letters Patent, is—

1. The combination with a wheel of a band-brake therefor having one end hinged, a rocker-arm with which the other end is connected, a frictional rim secured flatwise against the wheel, a shoe loosely mounted on the axis of the wheel and adapted to contact with said rim and to travel with the wheel when the two are in engagement and mechanism intermediate of the shoe and the rocker-arm whereby when the shoe is pressed against the rim it is carried forward therewith so as to turn the rocker-arm and force the band against the wheel.

2. The wheel, a surrounding band-brake having one end pivoted, a rocker-arm with which the other end is connected, a power-lever also connected with the rocker-arm, a circular rim carried by the main wheel, a loose sleeve slidable with relation to the hub of the wheel, means for moving said sleeve to or from the wheel, a fulcrumed lever having one end connected with the sleeve and a shoe carried by the other end and capable of being forced into contact with the rim when the sleeve is moved outwardly, a second sleeve concentric with the first-named sleeve, and a link connecting the second sleeve with the lever of the rocker-arm whereby the revolution of the main wheel acts to apply the brake.

3. A main bearing-wheel, a band-brake substantially conforming to the upper portion of the wheel, having one end fulcrumed, a rocker-arm with which the other end is connected, a lever carried by the rocker-shaft, a circular frictional rim carried by the main wheel concentric with the axis thereof, a shoe and a lever to one end of which the shoe is fixed, a sliding sleeve connected with the shoe-lever and actuating the same to bring the shoe in contact with the frictional rim, and mechanism intermediate of said lever and the rocker-arm lever whereby the pressure of the shoe against the frictional rim transmits the revolving power of the main wheel to apply the brake thereto.

4. A wheel, a band-brake adapted to press thereon, a rocker-arm to which one end of the brake is connected and a lever turnable in unison with the rocker-arm, a sleeve fitting the wheel hub having a projecting arm, a lever fulcrumed upon said arm having a shoe upon its outer end, a rim carried by the wheel in the line of movement of the shoe, a second sleeve having lugs slidable in grooves of the first sleeve and connections with the inner end of the shoe-carrying lever, a ring loosely fitting the channel in the second sleeve, and a lever connected with said ring whereby the shoe-carrying lever may be turned about its fulcrum, and the shoe pressed against the rim so that the first-named sleeve is caused to turn in unison with the wheel and a link connecting said sleeve with the lever of the rocker-shaft whereby the latter is turned and the brake applied.

In witness whereof I have hereunto set my hand.

WILLIAM U. WADSWORTH.

Witnesses:
S. H. NOURSE,
JESSIE C. BRODIE.